United States Patent
Horimoto et al.

(10) Patent No.: US 7,577,864 B2
(45) Date of Patent: Aug. 18, 2009

(54) CONTROL METHOD OF COMPUTER, PROGRAM, AND VIRTUAL COMPUTER SYSTEM

(75) Inventors: Kazuhide Horimoto, Hachioji (JP); Toshiomi Moriki, Kunitachi (JP); Yuji Tsushima, Hachioji (JP); Takuichi Hoshina, Ebina (JP)

(73) Assignee: Hitachi, Ltd., Tokyo (JP)

( * ) Notice: Subject to any disclaimer, the term of this patent is extended or adjusted under 35 U.S.C. 154(b) by 525 days.

(21) Appl. No.: 11/514,186

(22) Filed: Sep. 1, 2006

(65) Prior Publication Data

US 2007/0192459 A1    Aug. 16, 2007

(30) Foreign Application Priority Data

Feb. 13, 2006    (JP) ............................. 2006-034878

(51) Int. Cl.
*G06F 11/00* (2006.01)
(52) U.S. Cl. ........................................... 714/3; 714/44
(58) Field of Classification Search .................... 714/3, 714/1, 4, 2, 43, 44, 47, 56
See application file for complete search history.

(56) References Cited

U.S. PATENT DOCUMENTS

| | | | |
|---|---|---|---|
| 5,550,990 A * | 8/1996 | Keener et al. ............... 710/315 |
| 5,970,066 A * | 10/1999 | Lowry et al. ................. 370/353 |
| 6,725,284 B2 | 4/2004 | Arndt | |
| 7,003,687 B2 * | 2/2006 | Matsunami et al. ............. 714/4 |
| 7,043,505 B1 * | 5/2006 | Teague et al. ................ 707/203 |
| 7,289,432 B2 * | 10/2007 | Hosoi .......................... 370/218 |
| 2008/0155243 A1 * | 6/2008 | Diep et al. ..................... 713/2 |

* cited by examiner

*Primary Examiner*—Dieu-Minh Le
(74) *Attorney, Agent, or Firm*—Brundidge & Stanger, P.C.

(57) ABSTRACT

Provided is a technology for increasing reliability of communication carried out by OSes and application programs operating on logical partitions set on a computer. The computer has multiple logical partitions constructed therein by a control program, the physical interfaces are shared by virtual interfaces respectively set for the multiple logical partitions, and the memory module stores management information indicating correspondences between the physical interface and the virtual interface. The control method comprising the steps of: obtaining, by the control module, communication data transferred to the external device and received by the virtual interface; obtaining, by the control module, correspondences between the physical interface and the virtual interface, selecting, by the control module, the physical interface used for the communication with the external device based on the correspondences between the physical interface and the virtual interface; and changing, by the control module, the correspondence between the physical interface and the virtual interface if a failure occurs in the communication path.

17 Claims, 21 Drawing Sheets

| PARTITION NUMBER ~15-11 | PHYSICAL NIC NUMBER ~15-12 | VIRTUAL NIC NUMBER ~15-13 | PRIORITY ~15-14 | |
|---|---|---|---|---|
| 12 | 201-1 | 17-4 | SECOND | ~15-1 |
| 12 | 201-2 | 17-5 | FIRST | ~15-2 |
| 11-1 | 201-1 | 17-1 | NONE | ~15-3 |

MANAGEMENT TABLE 15-101

FIG. 3

```
+------------------------------------------------------------------+
|+--Virtual Network Inter face Card (NIC) Assignment --------------+|
||                                               vn NUMBER         ||
||  No   NAME           STATUS   NUMBER OF vns   1     2           ||
||  1    PARTITION11-1  STOP        1            17-1  *           ||
||  2    PARTITION11-2  STOP        0            *     *           ||
||  3                                                              ||
||  4                                                              ||
||  5                                                              ||
||  6                                                              ||
||  7                                                              ||
||  8                                                              ||
||                                                                 ||
||                                                                 ||
|+-- Virtual NIC Information---------------------------------------+|
||   VIRTUAL NIC NUMBER: 17-1 MAC Address:00.00.00.00.00.01        ||
||   SHARED PHYSICAL NIC NUMBER : 201-1                            ||
++-----------------------------------------------------------------++
||   vn: VIRTUAL NIC    pn: PHYSICAL NIC   * : VIRTUAL NIC NOT ASSIGNED ||
++-----------------------------------------------------------------++
|  F1:Edit F2:Exit                                       Esc:Menu  |
+------------------------------------------------------------------+
```

SETTING SCREEN 303-1

FIG. 4

```
+---------------------------------------------------------------+
|+--Virtual Network Inter face Card (NIC) Assignment ----------+|
||                                    vn NUMBER                ||
||  No   NAME          STATUS  NUMBER OF vns   1      2        ||
||  1    PARTITION11-1 STOP        1          17-1   17-2      ||
||  2    PARTITION11-2 STOP        0          17-3   *         ||
||  3                                                          ||
||  4                                                          ||
||  5                                                          ||
||  6                                                          ||
||  7                                                          ||
||  8                                                          ||
||                                                             ||
||                                                             ||
|+-- Virtual NIC Information-----------------------------------+|
||   VIRTUAL NIC NUMBER: 17-1 MAC Address:00.00.00.00.00.01    ||
||   SHARED PHYSICAL NIC NUMBER : 201-1                        ||
++-------------------------------------------------------------++
||   vn: VIRTUAL NIC    pn: PHYSICAL NIC   * : VIRTUAL NIC NOT ASSIGNED  ||
++-------------------------------------------------------------++
|  F1:Edit F2:Exit                                    Esc:Menu  |
+---------------------------------------------------------------+
```

SETTING SCREEN 303-2

FIG. 5

| | 15-11 | 15-12 | 15-13 | 15-14 |
|---|---|---|---|---|
| | PARTITION NUMBER | PHYSICAL NIC NUMBER | VIRTUAL NIC NUMBER | PRIORITY |
| | 12 | 201-1 | 17-4 | SECOND |
| | 12 | 201-2 | 17-5 | FIRST |
| | 11-1 | 201-1 | 17-1 | NONE |
| | 11-1 | 201-2 | 17-2 | NONE |
| | 11-2 | 201-1 | 17-3 | NONE |

MANAGEMENT TABLE 15-102

*FIG. 6*

```
+----------------------------------------------------------------+
|+------ System Configuration ---------------------------------+  |
|| Management Application Program IP Address    nnn.nnn.nnn.nnn|  |
|| Management Server IP Address                 nnn.nnn.nnn.nnn|  |
|| Sub Net Mask                                 nnn.nnn.nnn.nnn|  |
|| Default Gateway                              nnn.nnn.nnn.nnn|  |
||                                                             |  |
|| Management NIC                               201-2          |  |
|| Spare Management NIC                         201-1          |  |
||                                                             |  |
|| FailOver                                     Enable         |  |
||                                                             |  |
|+-------------------------------------------------------------+  |
|                                                                 |
+----------------------------------------------------------------+
| F1:Edit    F2:Exit                                    Esc:Menu |
+----------------------------------------------------------------+
```

SETTING SCREEN 303-3

FIG. 8

```
+-----------------------------------------------------------------+
|+------ System Configuration -----------------------------+      |
|| Management Application Program IP Address   nnn.nnn.nnn.nnn |  |
|| Management Server IP Address                nnn.nnn.nnn.nnn |  |
|| Sub Net Mask                                nnn.nnn.nnn.nnn |  |
|| Default Gateway                             nnn.nnn.nnn.nnn |  |
||                                                             |  |
|| Management NIC                              201-1           |  |
|| Spare Management NIC                        201-2           |  |
||                                                             |  |
|| FailOver                                    Enable          |  |
||                                                             |  |
|+-------------------------------------------------------------+  |
|                                                                 |
+-----------------------------------------------------------------+
| F1:Edit    F2:Exit                                  Esc:Menu    |
+-----------------------------------------------------------------+
```

SETTING SCREEN  303-4

*FIG. 9*

| | 15-11 | 15-12 | 15-13 | 15-14 |
|---|---|---|---|---|
| | PARTITION NUMBER | PHYSICAL NIC NUMBER | VIRTUAL NIC NUMBER | PRIORITY |
| | 12 | 201-1 | 17-4 | SECOND |
| | 12 | 201-2 | 17-5 | FIRST |
| | 11-1 | 201-1 | 17-1 | NONE |
| | 11-1 | 201-2 | 17-2 | NONE |
| | 11-2 | 201-1 | 17-3 | NONE |

MANAGEMENT TABLE 15-103

*FIG. 10*

| PARTITION NUMBER ~15-11 | PHYSICAL NIC NUMBER ~15-12 | VIRTUAL NIC NUMBER ~15-13 | PRIORITY ~15-14 |
|---|---|---|---|
| 12 | 201-1 | 17-4 | SECOND |
| 12 | 201-2 | 17-5 | FIRST |
| 11-1 | 201-1 | 17-1 | NONE |
| 11-1 | 201-2 | 17-2 | NONE |
| 11-2 | 201-1 | 17-3 | NONE |

MANAGEMENT TABLE 15-104

*FIG. 13*

CONTROL METHOD OF COMPUTER, PROGRAM, AND VIRTUAL COMPUTER SYSTEM

CLAIM OF PRIORITY

The present application claims priority from Japanese application P2006-034878 filed on Feb. 13, 2006, the content of which is hereby incorporated by reference into this application.

BACKGROUND

This invention relates to a technology for increasing reliability of communication carried out by OSes and application programs operating on logical partitions set on a computer.

As information systems become large and complicated, operation/management costs of servers constituting the information systems increase. To address this problem, there is known "server consolidation" which assigns existing physical servers to virtual servers to reduce the number of the physical servers. There is known "server virtualization" as means for the server consolidation.

The server virtualization is a technology to divide one computer resource into multiple logical partitions. An OS (i.e., guest OS) runs in the respective partitions, and the respective partitions function as virtual servers. Software for generating logical partitions, and controlling the generated partitions is a virtual machine monitor (hereinafter, referred to as "VMM"). It is possible to construct an information system by means of the guest OSes operating in the respective partitions generated by the VMM where the respective partitions function as independent servers.

In this information system, if a failure occurs to the VMM, the failure possibly exerts a crucial influence on the information system. It is thus important to monitor a failure of the VMM in order to secure the reliability of the information system. Moreover, missed detection and excessive detection of a failure pose problems in the failure monitoring, and high reliability is thus essential for the failure monitoring.

In order to increase the reliability of the failure monitoring, resources relating to the failure monitoring are to be multiplexed. The resources relating to the failure monitoring include management servers and communication paths to the management servers.

As for the management servers, the management servers should be multiplexed. On the other hand, as for the communication paths to the management servers, there poses the following problem as a result of the application program of the server virtualization.

In other words, since the server virtualization generates multiple partitions on one computer, the OSes operating on the respective partitions use I/O devices. As a result, if dedicated communication paths to the management servers are provided, and these communication paths are multiplexed, the I/O devices are consumed. As a result, the number of servers which can be consolidated by means of the server consolidation decreases, resulting in a decrease of the effect to reduce the operation/management costs.

Therefore, there arises an object to increase the reliability of the communication paths to the management servers without consuming the I/O devices.

In order to attain this object, there are two known conventional technologies which include a technology to restrain the consumption of the I/O devices in the server virtualization, and a technology to increase the reliability of the communication paths to the management servers.

According to the technology to restrain the consumption of the I/O devices in the server virtualization, there is provided a service OS (Hosting Partition), and this OS directly controls the physical I/O devices. In other partitions, when there is received an access to a virtual I/O device, the VMM notifies the service OS of the access, and an access to a physical I/O device is carried out. Consequently, the multiple partitions can share a single I/O device, and the consumption of the I/O devices can be restrained (refer to U.S. Pat. No. 6,725,284). A technology used to share a network interface card (NIC), which is an I/O device, is referred to as "NIC sharing technology".

Moreover, as a technology to increase the reliability of the communication paths to the management servers is know multiplexing. Generally, the management servers are also multiplexed at the time of multiplexing of the communication paths in order not to stop the monitoring even if a failure occurs to each management server. Moreover, when multiplexed communication paths and management servers are used, and there is detected a failure (such as a communication error) in the management server or the communication path, a failed management server or communication path is switched to other management server or communication path. This technology is referred to as "Fail Over".

SUMMARY

However, if the NIC sharing technology and the Fail Over technology are combined, there poses the following problem.

The NIC sharing technology restrains the consumption of the I/O devices by sharing the NIC with other partitions as the communication path to the management server. As a result, if the NIC is failed over, there occur partitions which cannot communicate with an external network. Thus, there poses a problem that a failure of a management server or a communication path propagates to other partitions.

This invention has been made in view of the problem of the conventional art, and a purpose of this invention is to prevent influence on an operation of other guests even if a communication path is failed over due to a failure of a management server while sharing physical NICs used by other guests in order to restrain the consumption of I/O devices as communication paths to the management servers according to the server virtualization.

According to an embodiment of this invention, there is provided a control method carried out on a computer, characterized in that: the computer has multiple logical partitions constructed therein by a control program, the physical interfaces are shared by virtual interfaces respectively set for the multiple logical partitions, and the memory module stores management information indicating correspondences between the physical interface and the virtual interface. The control method comprising the steps of: obtaining, by the control module, communication data transferred to the external device and received by the virtual interface; obtaining, by the control module, correspondences between the physical interface and the virtual interface, selecting, by the control module, the physical interface used for the communication with the external device based on the correspondences between the physical interface and the virtual interface; and changing, by the control module, the correspondence between the physical interface and the virtual interface if a failure occurs in the communication path.

According to this invention, because physical NICs used by a service OS in a service partition are shared by user OSes in the user partitions, and only a virtual NIC used for communication by the service OS is changed without changing the configuration of the shared physical NICs upon a communication failure, it is possible to continue communication without influence on the user OSes.

BRIEF DESCRIPTION OF THE DRAWINGS

FIG. 3 is an explanatory view of an example of the management table according to the first embodiment of this invention.

FIG. 4 is an explanatory view of an example of a setting screen according to the first embodiment of this invention.

FIG. 5 is an explanatory view of an example of the setting screen according to the first embodiment of this invention.

FIG. 6 is an explanatory view of an example of the management table after an update according to the first embodiment of this invention.

FIG. 8 is an explanatory view of an example of a setting screen of priority according to the first embodiment of this invention.

FIG. 9 is an explanatory view of an example of the setting screen of priority according to the first embodiment of this invention.

FIG. 10 is an explanatory view of an example of the management table after an update according to the first embodiment of this invention.

FIG. 13 is an explanatory view of an example of the management table after an update according to the first embodiment of this invention.

DETAILED DESCRIPTION OF THE PREFERRED EMBODIMENTS

A description will now be given of embodiments of this invention with reference to the accompanying drawings.

Figure 1:
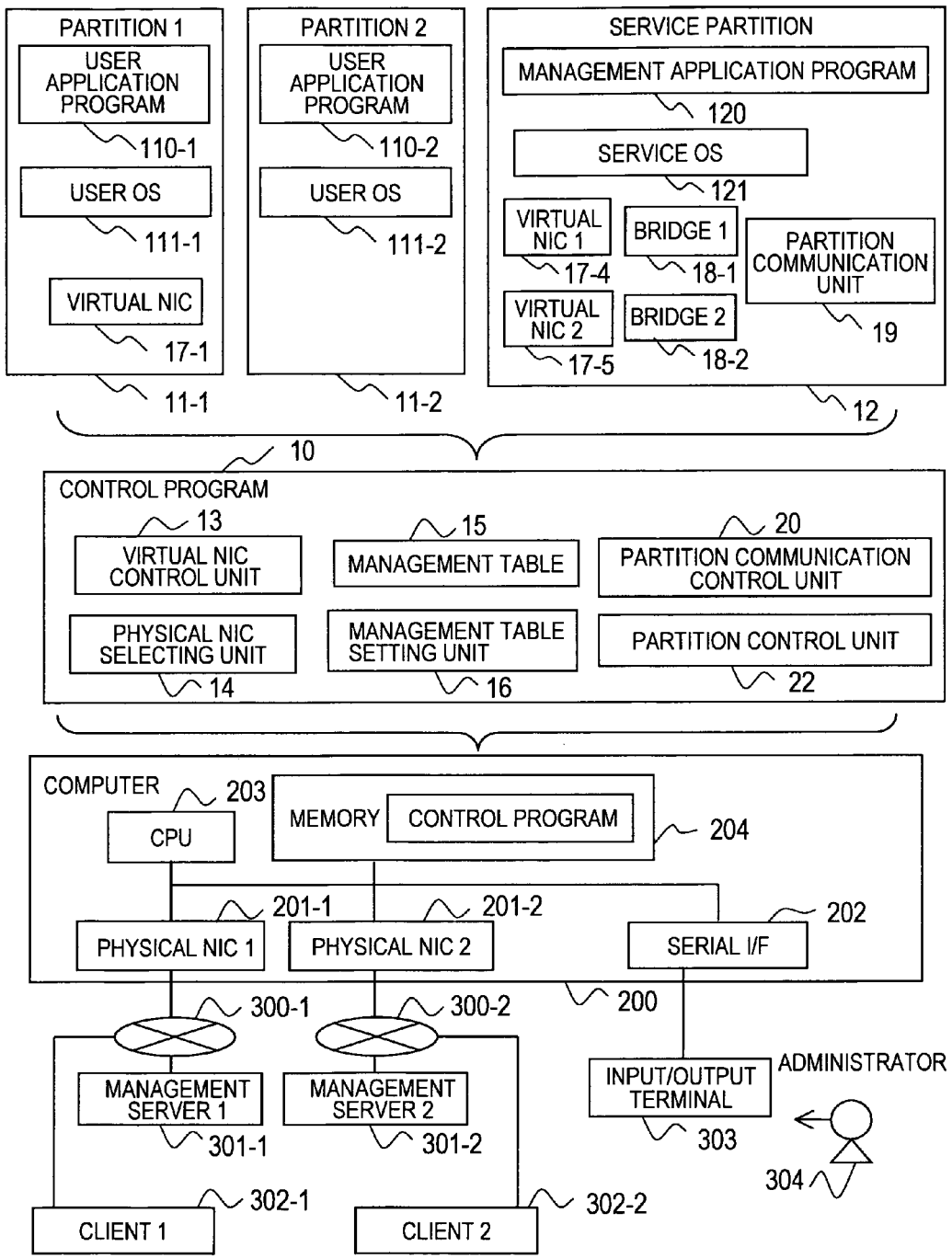
FIG. 1 is a block diagram showing a computer and a virtual computer system according to a first embodiment of this invention.

FIG. 1 is a block diagram of a computer 200 and a virtual computer system according to a first embodiment of this invention.

According to the embodiment of this invention, a control program 10 configures multiple partitions 11 on the one computer 200. On the respective partitions 11 are operating a user OS 111 and a user application program 110. Moreover, the control program 10 configures a service partition 12 in which a management application program 120, which manages the respective partitions 11, operates.

In other words, in the computer 200, the control program 10 causes the multiple partitions 11 and the service partition 12 to constitute the virtual computer system.

The computer 200 includes multiple physical network interface cards network interface cards (hereinafter, referred to as NICs) 201 (201-1 and 201-2), a serial interface 202, a CPU 203, and a memory 204.

The physical NIC 201-1 is connected to a management server 301-1 and a client 302-1 via a network 300-1 outside the computer 200.

The physical NIC 201-2 is connected to an external device (a management server 301-2 and a client 302-2) via a network 300-2 outside the computer 200.

These networks 300-1 and 300-2 are constructed by the Ethernet, for example. It should be noted that the networks 300-1 and 300-2 may be wired networks or wireless networks. If they are wired networks, cables thereof may be constituted by optical fibers, power lines, and the like.

The serial interface (I/F) 202 is connected to an input/output terminal 303 outside the computer 200.

The input/output terminal 303 outputs a management screen, and receives inputs from an administrator 304, thereby setting the computer 200 according to the inputs. It should be noted that though the computer 200 and the input/output terminal 303 are connected with each other via the serial interface 202, they may be connected with each other via other interface. For example, the input/output terminal 303 may be connected via a network 300, and the administrator 304 may set the computer 200 from a Web interface. Moreover, the management server 301 may use a protocol such as IPMI and SNMP, and the administrator 304 may operate the management server 301 to set the computer 200. Moreover, interfaces such as a VGA card, a keyboard, and a mouse may be provided on the computer 200, an output from the control program 10 may be output from the VGA card, and an input may be received from the administrator 304.

The CPU 204 supervises processing by the computer 200. Moreover, the CPU 204 reads out a program stored in the memory 205, and executes processes prescribed by the program.

The memory 205 stores various programs such as the control program 10 described later.

A description will now be given of the control program 10.

The control program 10 is a hypervisor (generally referred to as firmware) which logically divides hardware resources of the computer 200 (i.e., computer resources), and manages resulting logical partitions (LPARs). In other words, the control program 10 logically divides the CPU 204 and the memory 204 of the computer 200, and assigns resulting logical partitions as the partitions 11. In the respective control partition 11, the CPU 204 which has been logically divided operates as a virtual CPU, and executes an OS, programs, and the like.

The control program 10 provides the logically divided logical partitions as the partitions 11 which are logical partitions provided for users, and a service partition 12 which is used to manage the control program 10. It should be noted that arbitrary number of partitions 11 may be set by the administrator 304 or the like. Moreover, only one service partition 12 is set for one control program 10. It should be noted that the control program 10 may set multiple service partitions 12, and multiple service OSes may be present in the computer 200.

Moreover, the control program 10 sets the physical NICs 201, which are computer resources, as multiple virtual NICs, and allocates the resulting virtual NICs to the respective partitions 11 and the service partition 12.

This control program 10 includes a virtual NIC control unit 13, a physical NIC selecting unit 14, a management table 15, a management table setting unit 16, a partition communication control unit 20, and a partition control unit 22.

The virtual NIC control unit 13 receives communication from the set virtual NIC 17.

The physical NIC selecting unit 14 refers to the management table 15, and selects physical NIC information corresponding to the virtual NIC 17.

The management table 15 retains correspondences between the respective partitions 11 and the service partition 12, and the virtual NICs 17 and the physical NICs 201, and priority information on the respective correspondences.

The management table setting unit 16 receives setting on the input/output terminal 303 by the administrator 304, and a management table change request from the service partition 12, and then updates the management table 15.

The partition communication control unit 20 communicates with a partition communication unit 19 of the service partition 12. To be specific, communication data transmitted by the control program 10 to the partition communication control unit 20 is received by the partition communication unit 19 of the service partition 12. Moreover, the communication data transmitted by the service partition 12 to the partition communication unit 19 is received by the partition communication control unit 20 of the service partition 10.

Set in the example shown in FIG. 1 are two partitions 11-1 and 11-2, and the one service partition 12.

In the partition 11-1 is operating an OS (referred to as user OS) 111-1 used by users. Executed on this user OS 111-1 is a user application program 110-1. Allocated to this partition 11-1 is a virtual NIC 17-1. In other words, the user application program 110-1 uses the virtual NIC 17-1 for communication via the user OS 111-1 to communicate with external devices such as clients 302 and management servers 301.

In a similar manner, operated on the partition 11-2 is the user OS 111-2, and executed on the user OS 111-2 is the user application program 110-2. It should be noted that, to the partition 11-2, a virtual NIC 17 is not allocated.

Operated on the service partition 12 is a service OS 121 which manages the control program 10. Executed on the service OS 121 is a management application program 120.

Exclusively allocated to this service partition 12 are physical NICs 201-1 and 202-2 which are shared and thus utilized by the multiple user OSes. Allocated to the physical NIC 201-1 is a bridge 18-1, and the physical NIC 201-1 is connected to the virtual NIC 17-4 via the bridge 18-1.

In other words, when the service partition 12 transmits communication information to the virtual NIC 17-4 allocated to the service partition 12, the communication information is transmitted to the physical NIC 201-1 via the bridge 18-1 allocated to the virtual NIC 17-4.

Moreover, when other user partition, namely the partition 11-1 transmits communication information to the virtual NIC 17-1 allocated to the partition 11-1, the physical partition NIC 201-1 allocated to the virtual NIC 17-1 is selected, and then the virtual NIC 17-4 of the service partition allocated to this physical NIC 201-1 is then selected. Then, the communication information is once forwarded to the virtual NIC 17-4. This communication information is transmitted to the physical NIC 201-1 via the bridge 18-1 allocated to this virtual NIC 17-4.

In a similar manner, allocated to the physical NIC 201-2 is a bridge 18-2, and the physical NIC 201-2 is connected to the virtual NIC 17-5 via the bridge 18-2.

The partition communication unit 19 communicates with the partition communication control unit 20 of the control program 10 as described above.

Figure 2:
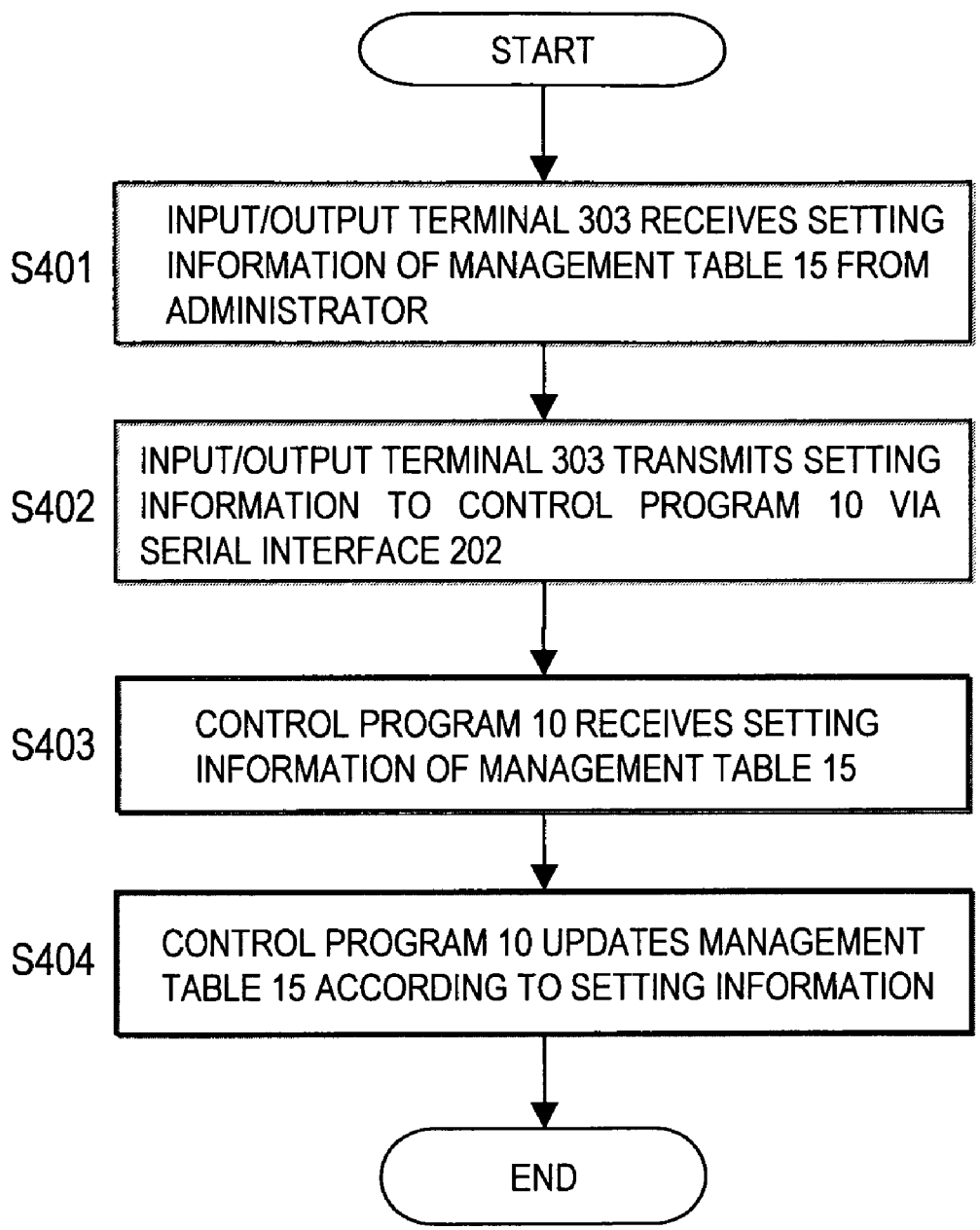
FIG. 2 is a flowchart of a process for updating a management table according to the first embodiment of this invention.

FIG. 2 is a flowchart of a process for updating the management table 15.

The administrator 304 uses the input/output terminal 303 to input setting information to be retained by the management table 15. The input/output terminal 303 receives the setting information input by the administrator 304 (S401).

Then, the input/output terminal 303 transmits the received setting information via the serial interface 304 to the control program 10 of the computer 200 (S402).

The management table setting unit 16 of the control program 10 receives the setting information transmitted from the input/output terminal 303 (S403).

Then, the management table setting unit 16 reflects the received setting information in the management table 15. The management table 15 is updated according to contents of this setting information (S404).

A description will now be given of a specific example of the process in FIG. 2.

FIG. 3 is a diagram showing an example of the management table 15.

The management table 15 includes a partition number 15-11, a physical NIC number 15-12, a virtual NIC number 15-13, and a priority 15-14.

The partition number 15-11 stores an identifier of the partition 11 or the service partition 12 to which the virtual NIC 17 is allocated. The physical NIC number 15-12 stores an identifier of the physical NIC 201 to which the virtual NIC 17 is allocated. The virtual NIC number 15-13 stores an identifier of the virtual NIC 17. The priority 15-14 stores an identifier used to determine which virtual NIC is used by priority when the service partition 12 uses a virtual NIC for the communication.

To be specific, stored in an entry 15-1 is the virtual NIC 17-4 which a partition having the partition number "12", namely the service partition 12 uses. This virtual partition NIC 17-4 is allocated to the physical NIC 201-1, and the priority thereof is set to "SECOND". In a similar manner, in an entry 15-2 is set the priority of the virtual NIC 17-5 to "FIRST". Thus, when the service partition 12 carries out communication for the management, the service partition 12 uses the virtual NIC 17-5 whose priority is first for the communication.

FIG. 4 is a view describing an example of a setting screen shown on the input/output terminal 303.

Shown on the screen of the input/output terminal 303 is a setting screen 303-1 shown in FIG. 4. The administrator 304 refers to this setting screen to input setting information by means of a keyboard or the like.

The administrator 304 uses the screen 303-1 to set a correspondence among the partition 11 or the service partition 12, the physical NIC 201, and the virtual NIC 17. It should be noted that though the setting screen in FIG. 4 is intended for a serial console screen, the administrator 304 may carry out the setting by means of a similar method such as a Web browser screen or a VGA screen.

The example shown in FIG. 4 indicates that only the virtual NIC 17-1 is set to the partition 11-1. Moreover, a middle level of the screen shows information on the virtual NICs 17. In other words, the middle level indicates that this virtual NIC 17-1 has a MAC (Media Access Control) address of 00.00.00.00.00.01, and shares the physical NIC 201 whose physical NIC number is 201-1.

FIG. 5 is a view describing an example of the setting screen shown on the input/output terminal 303, and showing setting information after the administrator 304 has input setting information.

The example in FIG. 5 shows that the administrator 304 has further allocated the virtual NIC 17-2 to the partition 11-1, and a virtual NIC 17-3 to the partition 11-2 in addition to the setting information in FIG. 4.

When the administrator 304 inputs the setting information in FIG. 5, the input/output terminal 303 transmits the setting information to the control program 10 in the step 402 in FIG. 2. Then, in the step 402 in FIG. 2, the management table setting unit 16 of the control program 10 receives the setting information, and reflects the setting in the management table 15, thereby updating the management table 15.

FIG. 6 is a view describing an example of the management table 15 updated by this process.

FIG. 6 shows that the virtual NIC 17-2 which shares the physical NIC 201-2 is added to the partition 11-1, and the virtual NIC 17-3 which shares the physical NIC 201-1 is added to the partition 11-2 according to the setting information in FIG. 5.

Figure 7:
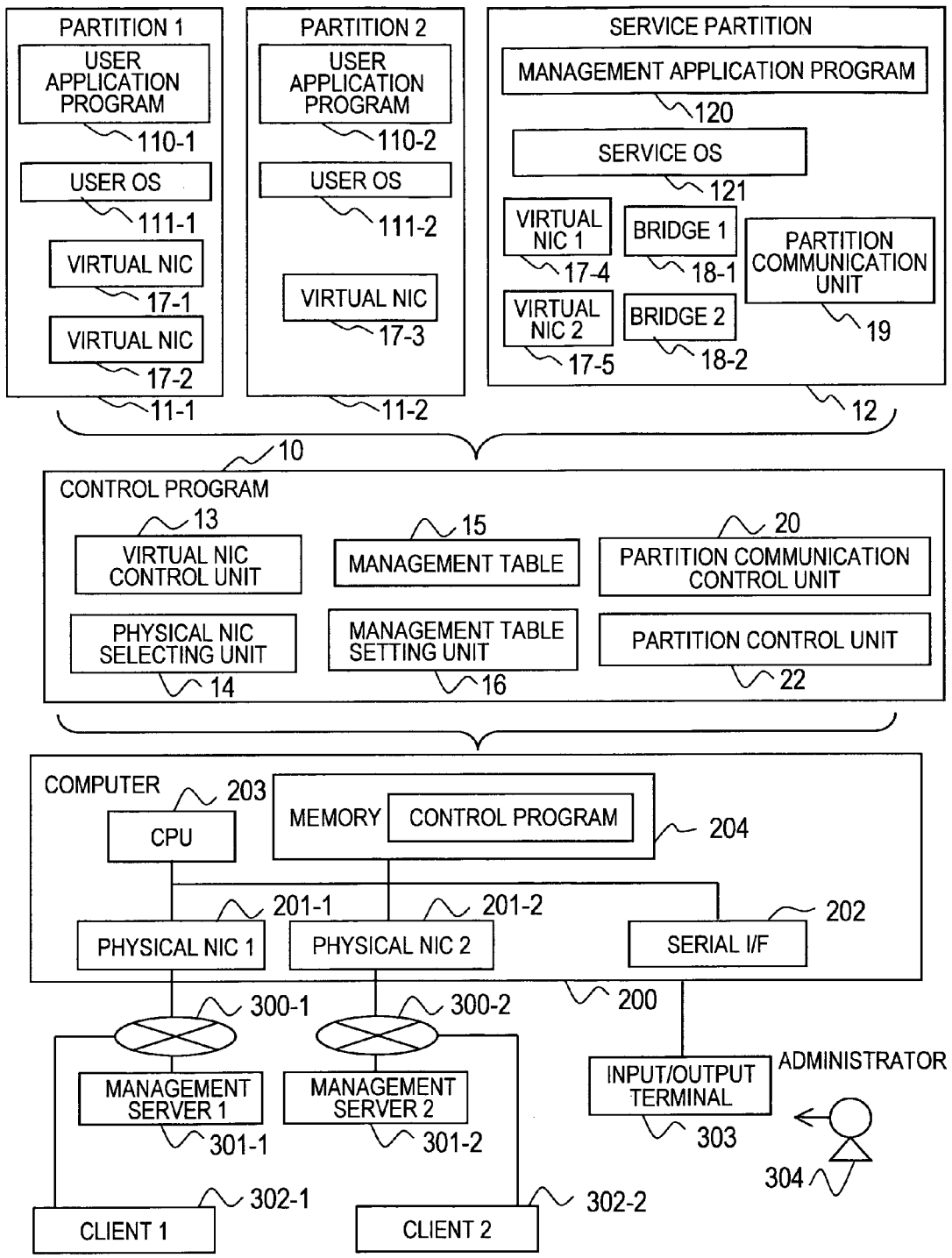
FIG. 7 is a block diagram showing the computer and the virtual computer system according to the first embodiment of this invention.

FIG. 7 is a block diagram of the computer 200 when the virtual NIC 17-2 and the virtual NIC 17-3 are allocated as a result of the setting shown in FIGS. 5 and 6.

In this way, the administrator 304 inputs setting information on the setting screen of the input/output terminal 303, thereby updating the management table 15.

Moreover, the administrator 304 uses the setting screen to set the priorities.

FIG. 8 is a view describing an example of a setting screen used to set the priorities shown on the input/output terminal 303.

Shown on the screen of the input/output terminal 303 is a setting screen 303-3 shown in FIG. 8. The administrator 304 refers to this setting screen to input setting information on priorities by means of a keyboard or the like.

The example shown in FIG. 8 shows that "201-2", namely the physical NIC 201-2, is allocated to the management NIC which is used for the management by the service partition 12. In a similar manner, it shows that "201-1", namely the physical NIC 201-1, is allocated to a spare management NIC which is used as a spare of the management NIC. Consequently, the priority of the management NIC is set to first, and the priority of the spare management NIC is set to second. It should be noted that it is possible to set a physical NIC 201 which has a third or lower priority by adding entries for spare management NICs therebelow.

When the administrator 304 inputs the setting information in FIG. 8, the input/output terminal 303 transmits the setting information to the control program 10 in the step 402 in FIG. 2. Then, in the step 402 in FIG. 2, the management table setting unit 16 of the control program 10 receives the setting information, and reflects the setting in the management table 15, thereby updating the management table 15.

On this occasion, the service partition 12 receives the notice from the control program 10, obtains the contents of the management table 15, and obtains information on the management NIC 201, namely the physical NIC 201 whose priority is first, and the virtual NICs 17. The service partition 12 uses the information to set a bridge 18 between the physical NIC 201 and the virtual NIC 17.

FIG. 9 is a view describing an example of the setting screen used to set the priorities shown on the input/output terminal 303, and showing setting information after the administrator 304 has input setting information.

The example shown in FIG. 9 shows that the administrator 304 assigns the physical NIC 201-1 to the management NIC, and the physical NIC 201-2 to the spare management NIC. This indicates that the priority of the physical NIC 201-1 is set to first.

When the administrator 304 inputs the setting information in FIG. 9, the input/output terminal 303 transmits the setting information to the control program 10 in the step 402 in FIG. 2. Then, in the step 402 in FIG. 2, the management table setting unit 16 of the control program 10 receives the setting information, and reflects the setting in the management table 15, thereby updating the management table 15.

FIG. 10 is a view describing an example of the management table 15 updated by this process.

FIG. 10 shows that, according to the setting information in FIG. 9, the priority of the physical NIC 201-1 is updated to first, and the priority of the physical NIC 201-2 is updated to second.

A description will now be given of an operation of the control program 10.

Figure 11:
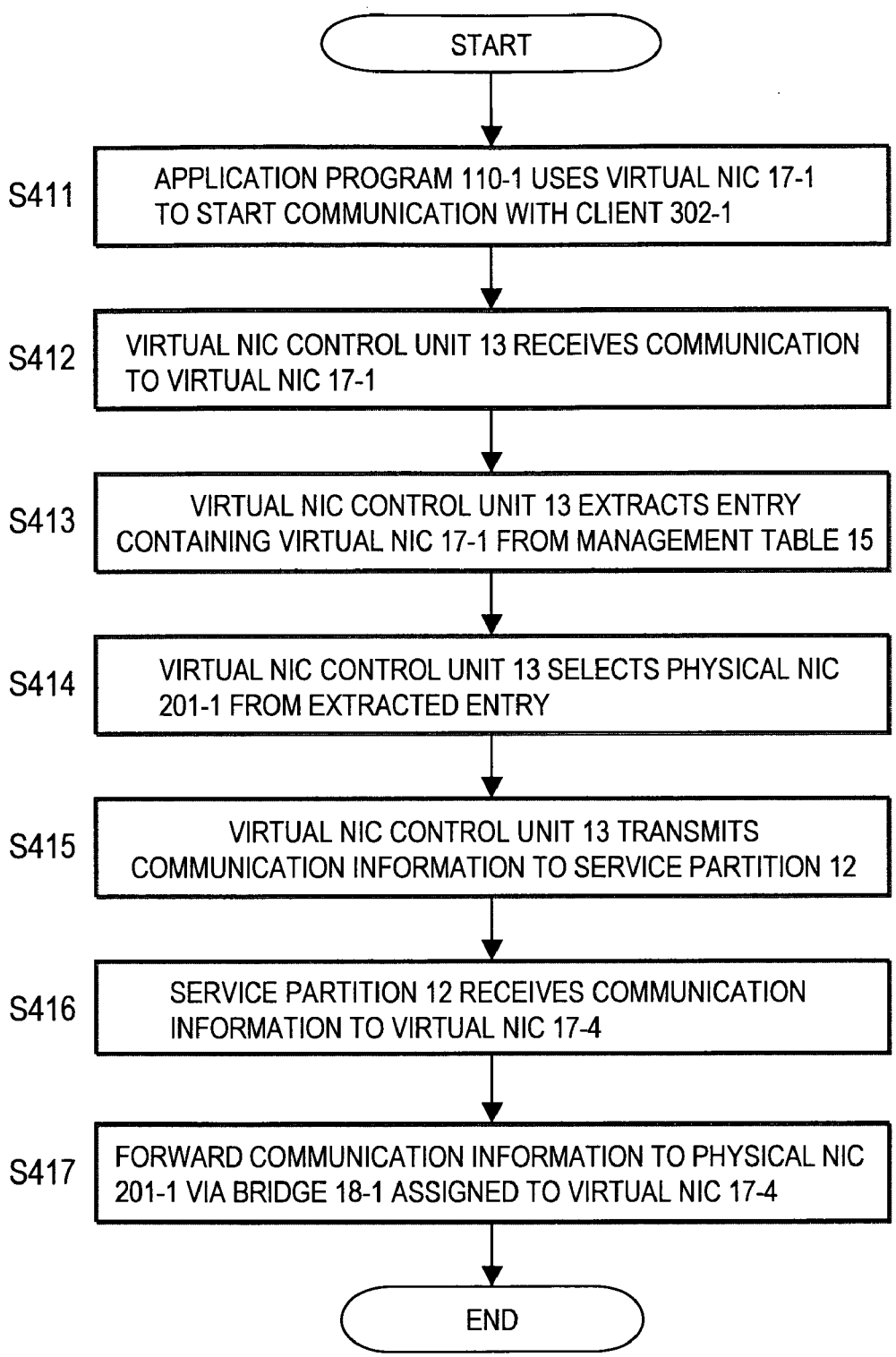
FIG. 11 is a flowchart of a process for a control program and a management application program according to the first embodiment of this invention.

FIG. 11 is a flowchart of a process of the control program 10 and the management application program 120 when the user application program 110 communicates with the client 302 outside the computer 200.

In the partition 11-1, the user application program 110-1 uses the virtual NIC 17-1 to start communication with the client 302-1 outside the computer 200. On this occasion, the user application program 110-1 transmits communication information, which is to be transmitted to the client 302-1, to the virtual NIC 17-1 (S411).

In the control program 10, the virtual NIC control unit 13 detects that the virtual NIC 17-1 has received the communication information (S412).

If the virtual NIC control unit 13 detects that the virtual NIC 17-1 has received the communication information, the virtual NIC control unit 13 refers to the management table 15 to obtain an entry containing the virtual NIC 17-1 which has received the communication information (S413).

Then, the virtual NIC control unit 13 selects information on the physical NIC 201 from the obtained entry. The virtual NIC control unit 13 selects a virtual NIC 17 of the service partition 12 corresponding to the obtained physical NIC 201 (S414). On this occasion, if multiple virtual NICs are selected, the virtual NIC control unit 13 selects an entry with the highest priority.

For example, if the management table 15 is set as shown in FIG. 10, and the user application program 110-1 in the partition 11-1 starts the communication with the virtual NIC 17-1, the virtual NIC control unit 13 searches the management table 15 according to the combination of the partition 11-1 and the virtual NIC 17-1. As a result of the search, the virtual NIC control unit 13 selects the corresponding physical NIC number 201. Then, the virtual NIC control unit 13 searches the management table 15 for a virtual NIC number corresponding to this physical NIC 201-1 in the service partition 12. As a result of the search, the virtual NIC control unit 13 selects the corresponding virtual NIC 17-4.

Then, the virtual NIC control unit 13 transmits the communication information received in the step S412 to the virtual NIC 17-4 selected in step S415 (S415).

Then, the virtual NIC 17-4 receives the communication information transmitted from the control program 10 in the service partition 12 (S416).

On this occasion, the communication information received by the virtual NIC 17-4 in the service partition 12 is forwarded by the bridge 18-1 allocated to the virtual NIC 17-4 to the physical NIC 201-1. As a result, the communication information transmitted from the user application program 110-1 is transmitted to the client 302-1 via the network 300-1.

According to the above process, there is provided the communication using the virtual NICs 17 allocated to the respective partitions 11.

A description will now be given of a process by the management application program 120.

Figure 12:
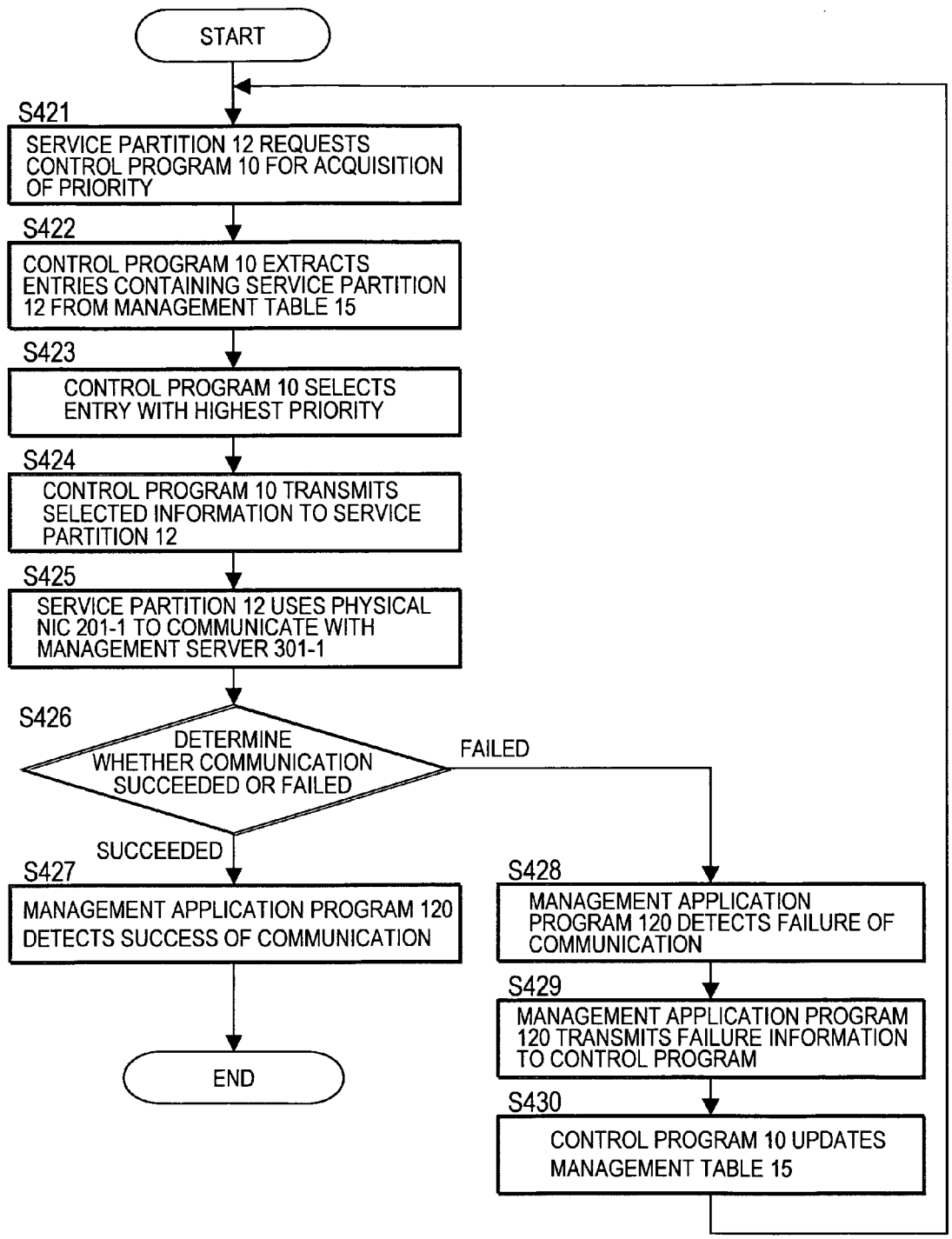
FIG. 12 is a flowchart of a process when the management application program communicates with a management server according to the first embodiment of this invention.

FIG. 12 is a flowchart showing a process when the management application program 120 communicates with the management server 301.

If the management application program 120 detects that the management table 15 has been changed by the control program 10 or a failure occurs to the partition 11 or the control program 10, the management application program 120 starts communication with the management server 301. As a result of this communication, the management application program 120 detects a presence of a failure in a communication path, and carries out a necessary process if a failure is present. It should be noted that the management application program 120 may periodically communicate with the management server 301 to detect that a failure occurs to a communication path. Alternatively, the management server 301 may communicate with the partitions 11, the service partition 12, or the control program 10 to detect that a failure occurs to the partition 11 or the control program 10.

First, the management application program 120 requests the control program 10 to obtain the priority of the physical NIC 201 of the service partition 12 from the management table 15 (S421). Subsequently, the partition communication unit 19 requests the partition communication control unit 20 to obtain the priority in the management table 15.

In the control program 10, the partition communication control unit 20 receives the request from the partition communication unit 19. The partition communication control unit 20 refers to the management table 15 to select an entry containing the service partition 12 (S422).

On this occasion, if the partition communication control unit 20 can select multiple entries containing information of the service partition 12, the partition communication control unit 20 selects an entry having the highest priority (S423).

For example, if the management table 15 is set as shown in FIG. 10, and requested to obtain the priority of the service partition 12, the control program 10 obtains entries set as the management NICs. Then, the control program 10 selects the physical NIC 201-1 contained in the entry with the highest priority (i.e., first priority) of the obtained entries.

Then, the partition communication control unit 20 transmits information contained in the selected entry to the partition communication unit 19 of the service partition 12 (S424).

When the partition communication unit 19 receives the information, the management application program 120 uses the physical NIC 201-1 contained in the information to communicate with the management server 301 (S425).

Then, the management application program 120 determines whether the communication succeeded or failed according to whether a response to the communication in the step S425 has been received or not (S426).

If the response from the management server 301 is an expected result, the management application program 120 determines that the communication succeeded, and proceeds to a step S427. In the step S427, since the management application program 120 has received the expected response from the management server 301, the management application program 120 determines that the communication succeeded, and thus finishes the process in FIG. 12.

On the other hand, if the management application program 120 has not received the expected response from the management server 301 due to a timeout or the like, the management application program 120 proceeds to a step S428. In the step S428, since the management application program 120 has not received the expected response from the management server 301, the management application program 120 determines that the communication failed. Then, the management application program 120 executes a subsequent communication recovery process.

First, the management application program 120 requests the partition communication unit 19 to notify the control program 10 of communication failure information containing the corresponding physical NIC 201-1 (S429).

When the partition communication control unit 20 in the control program 10 receives the communication failure information, the management table setting unit 16 updates the management table 15 (S430).

To be specific, the management table setting unit 16 refers to the management table 15 shown in FIG. 10, and selects entries containing the physical NIC 201-1 contained in the communication failure information. Then, the management table setting unit 16 decreases the priority of the selected entries. In other words, the management table setting unit 16 updates the priority of the physical NIC 201-1 to "SECOND". Moreover, the management table setting unit 16 sets the priority of the physical NIC 201-2 whose priority is second to "FIRST". As a result, the management table 15 is updated as shown in FIG. 13.

It should be noted that if a priority is not set to the management NIC, the process ends without updating the management table 15.

Then, the process returns to the step S421, and the management application program 120 resumes the process.

As described above, the management application program 120 detects a failure in a communication path, reduces the priority of the physical NIC 201 relating to the communication path upon a failure, and uses a physical NIC whose priority is second as the management NIC.

In this way, in the computer system according to the first embodiment of the this invention, if the management application program 120 detects a communication failure, the management application program 120 updates the priority information of the management table 15 (namely, changes setting only for IP addresses of the bridges and the like used by the management application program 120). On this occasion, since no change is made to the setting of the communication forwarding function of the virtual NICs 17 and the physical NICs 201, there is no influence on the communication of the physical NICs 201 shared by other partitions 11 on which the user OS 111 operates. Thus, the reliability of the computer system can be increased.

In particular, since communication paths are switched by means of the bridges 18 provided in the service partition 12 without adding physical components, it is possible to reduce the cost.

Second Embodiment

A description will now be given of a second embodiment.

The second embodiment is different from the above first embodiment in that multiple physical NICs 201 are allocated to one virtual NIC 17. According to this configuration, a Fail Over can be realized among the partitions 11. It should be noted that like components are denoted by like numerals as of the first embodiment, and descriptions thereof will be omitted.

Figure 14:
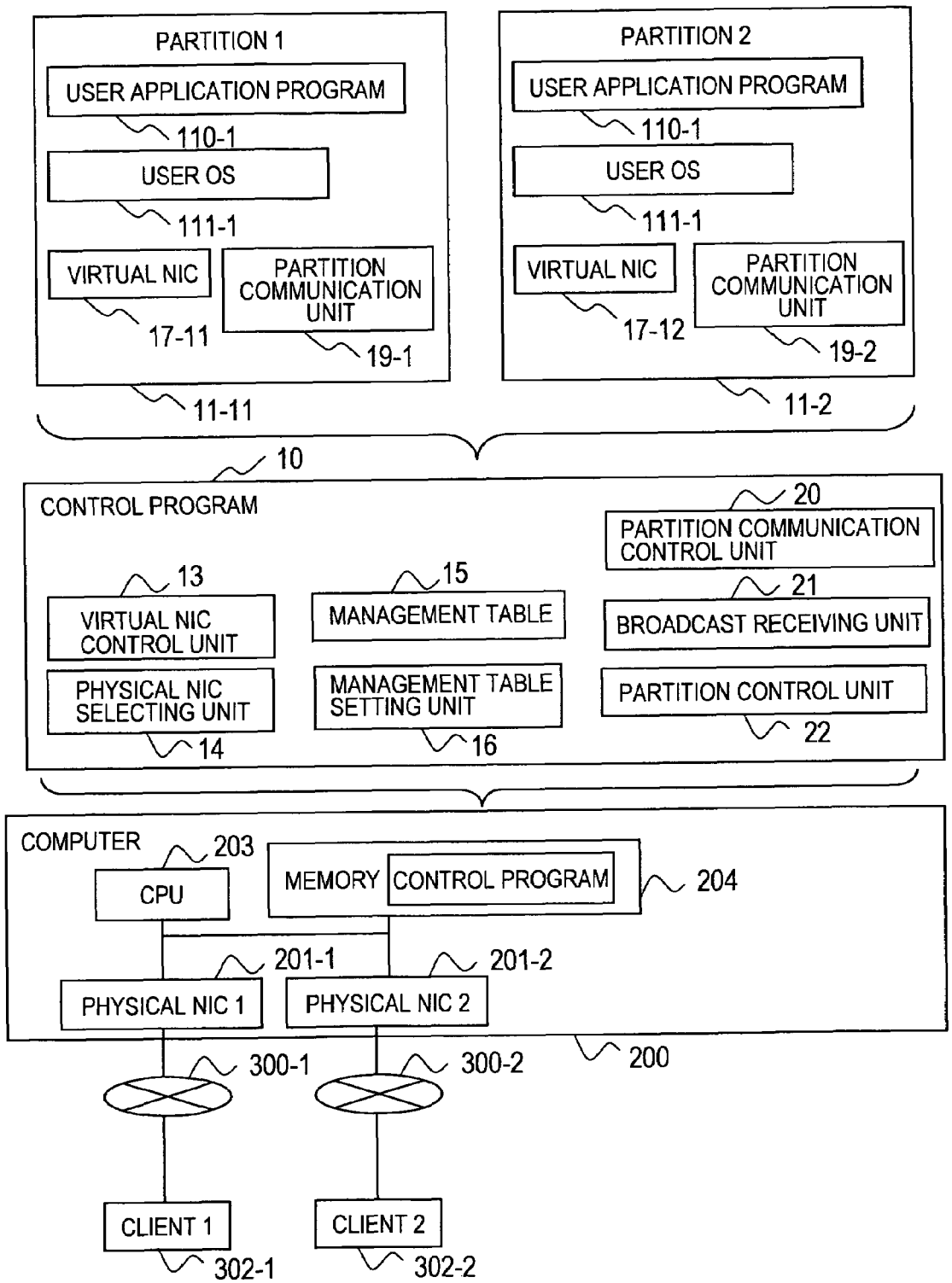
FIG. 14 is a block diagram showing a computer and a virtual computer system according to a second embodiment of this invention.

FIG. 14 is a block diagram of the computer 200 and a virtual computer system according to the second embodiment of this invention.

According to the second embodiment, the control program 10 includes a broadcast communication receiving unit 21. Moreover, the respective partitions 11 include the partition communication unit 19. In other words, communication data transmitted by the control program 10 to the partition communication control unit 20 is received by the partition communication unit 19 of the partition 11. Moreover, the communication data transmitted by the partition 11 to the partition communication unit 19 is received by the partition communication control unit 20 of the service partition 10.

Moreover, the virtual computer system according to this embodiment includes a partition 11-11 which is a main partition, and a spare partition 11-12 which takes over a process of the partition 11-11 if a failure occurs to the partition 11-11. In other words, when the user application program 110-1 is running in the partition 11-11, if a failure occurs in the partition 11-11, a user application program 110-2 in the spare partition 11-12 takes over the process of the user application program 110-1.

It should be noted that the user application program 110-1 uses the virtual NIC 17-11 to communicate with the clients 302, and the user application program 110-2 uses the virtual NIC 17-12 to communicate with the clients 302.

Moreover, according to this embodiment, multiple physical NICs 201 are allocated to one virtual NIC 17.

Figure 15:
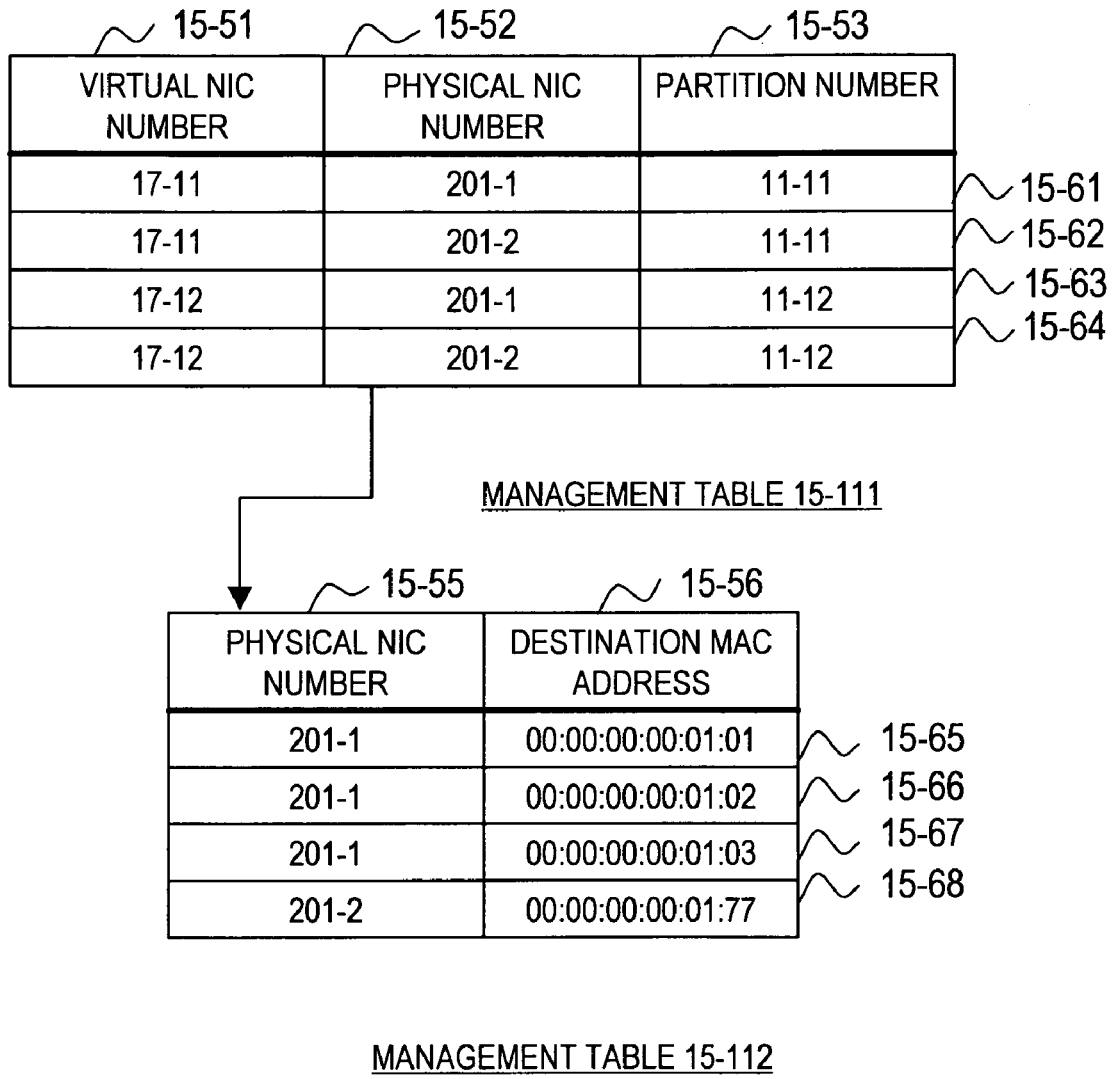
FIG. 15 is an explanatory view of an example of a management table according to the second embodiment of this invention.

FIG. 15 is a diagram showing an example of the management table 15 according to this embodiment.

The management table 15 according to this embodiment includes a management table 15-111 indicating correspondences among the virtual NIC 17, the physical NIC 201, and the partition 11, and a management table 15-112 indicating correspondences between the physical NIC 201 and destination MAC address.

The management table 15-111 includes a virtual NIC number 15-51, a physical NIC number 15-52, and a partition number 15-52. Moreover, the management table 15-112 includes a physical NIC number 15-55 and a destination MAC address 15-56.

The second embodiment determines combinations between a physical NIC 201 and a destination MAC address in advance, which is different from the above first embodiment. If there occurs communication with a virtual NIC 17 in the control program 10, physical NICs 201 are selected according to a destination MAC address contained in the communication, and one of the physical NICs 201 corresponding to a virtual NIC 17 and a partition 11 is selected. Then, communication information is transmitted to the selected physical NIC 201.

Figure 16:
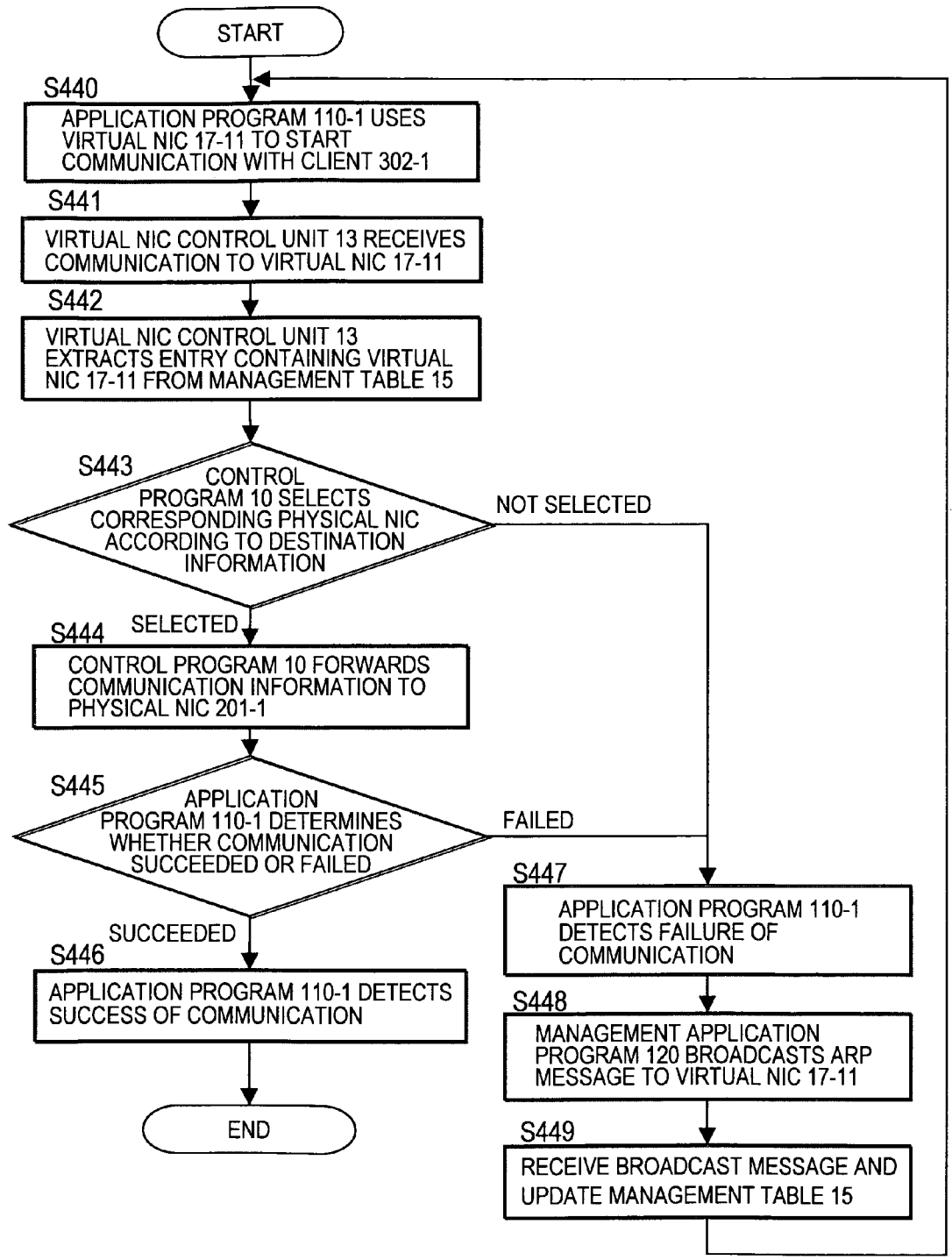
FIG. 16 is a flowchart of a process when a user application program communicates with a client according to the second embodiment of this invention.

FIG. 16 is a flowchart of a process of the user application program 110-1 and the control program 10 when the user application program 110-1 communicates with the client 302 outside the computer 200.

In the partition 11-11, the user application program 110-1 uses the virtual NIC 17-11 to start communication with the client 302-1 outside the computer 200. On this occasion, the user application program 110-1 transmits communication information, which is to be transmitted to the client 302-1, to the virtual NIC 17-11 (S440).

In the control program 10, the virtual NIC control unit 13 detects that the virtual NIC 17-11 has received the communication information (S441).

If the virtual NIC control unit 13 detects that the virtual NIC 17-11 has received the communication information, the virtual NIC control unit 13 obtains a destination MAC address contained in the communication information. Then, the virtual NIC control unit 13 refers to the management table 15 to select entries containing the obtained MAC address (S442).

To be specific, the virtual NIC control unit 13 refers to the management table 15-111 to obtain information on the physical NIC 201 corresponding to the MAC address, which is the destination of the communication, and a combination of the virtual NIC 17 and the partition number which is the source of the communication.

Then, the physical NIC selecting unit 14 determines whether a physical NIC 201 is selected or not based on the obtained information (S443). If the selection of the physical NIC 201 is successful, the process proceeds to a step S444. On the other hand, if the selection of a physical NIC 201 is failed due to the destination MAC address being not registered to the management table 15 or other reason, the process proceeds to a step S447.

In step S445, the physical NIC selecting unit 14 forwards the communication information received from the virtual NIC 17-11 to the selected physical NIC 201. As a result, the communication information transmitted from the user application program 110-1 is transmitted to the client 302-1.

Then, the user application program 110-1 determines whether the communication succeeded or failed according to whether a response to the communication in the step S444 has been received or not (S445).

If the response from the client 302 is an expected result, the user application program 110-1 determines that the communication was successful, and proceeds to a step S446. In the step S446, since the user application program 110-1 has received the expected response from the client 302, the user application program 110-1 determines that the communication was successful, and thus finishes the process in FIG. 16.

On the other hand, if the user application program 110-1 has not received the expected response from the client 302 due to a timeout or the like, the user application program 110-1 proceeds to the step S447.

In the step S447, the user application program 110-1 detects that the communication failed due to such a reason that the expected response was not received from the client 302, or the MAC address of the communication destination is not registered. Then, the user application program 110-1 executes a subsequent communication recovery process.

If the communication failed, the user application program 110-1 transmits an ARP message to the virtual NIC 17-11 by means of a broadcast to update an ARP table (S448).

In the control program 10, the broadcast communication receiving unit 21 receives the broadcast communication transmitted to the virtual NIC 17-11. Then, the broadcast communication receiving unit 21 transmits this broadcast communication to the networks 300 via all the physical NICs 201. Then, if the broadcast communication receiving unit 21 receives a response to the broadcasted ARP message, the broadcast communication receiving unit 21 updates the ARP table based on a received content, and updates the management table 15.

It should be noted that if the destination MAC address is not registered to the management table 15 in the step S443, the control program 10 receives an ARP message from the network 300 at any time, and creates an ARP table. The control program 10 generates the management table 15 based on this ARP table.

As described above, the user application program 110-1 detects a failure in the communication path in communication via the virtual NIC 17, updates the ARP table if a failure is present, and deletes the physical NIC 201 relating to a path which cannot be reached from the management table 15.

A specific description will be given of this process.

In the process shown in FIG. 16, it is assumed that there occurs a failure in a communication path from the physical NIC 201-1 to the client 302-1 with a destination MAC address "00:00:00:00:01:01", and the failure of the communication is detected in the step S447. On this occasion, the user application program 110-1 broadcasts an ARP message thorough all the physical NICs 201 (step S448).

Figure 17:
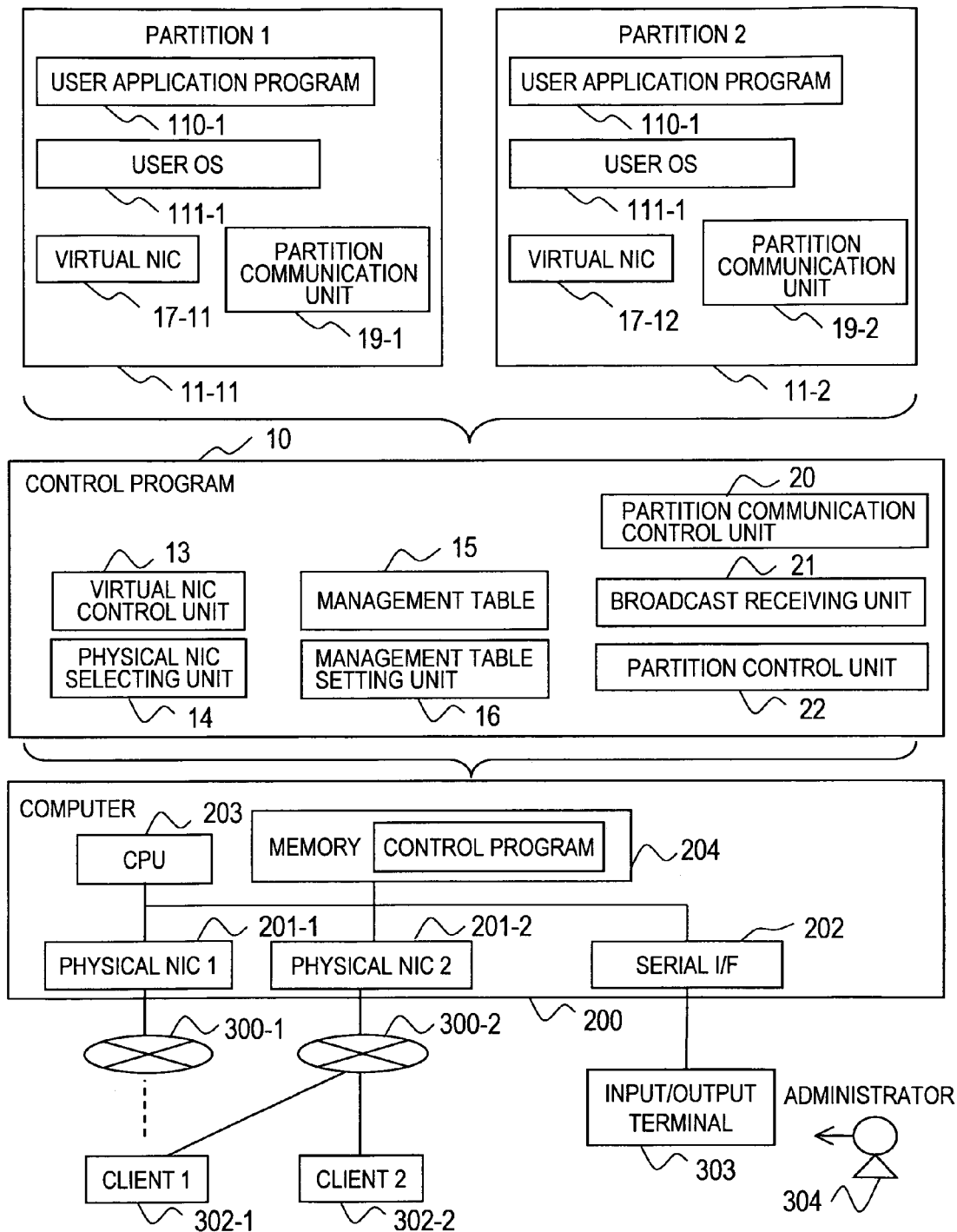
FIG. 17 is a block diagram showing the computer and the virtual computer system after an update according to the second embodiment of this invention.

As a result of this broadcast, as the path from the computer 200 to the client 302-1, there is detected a communication path routing through the physical NIC 201-2 and the network 300-2 (refer to FIG. 17).

As a result, the management table setting unit 16 uses MAC address information contained in a received message to update the management table 15 (S449). In other words, the management table setting unit 16 deletes the entry 15-65 from the management table 15 before the update (FIG. 15), and adds an entry 15-88 corresponding to the detected path.

Figure 18:
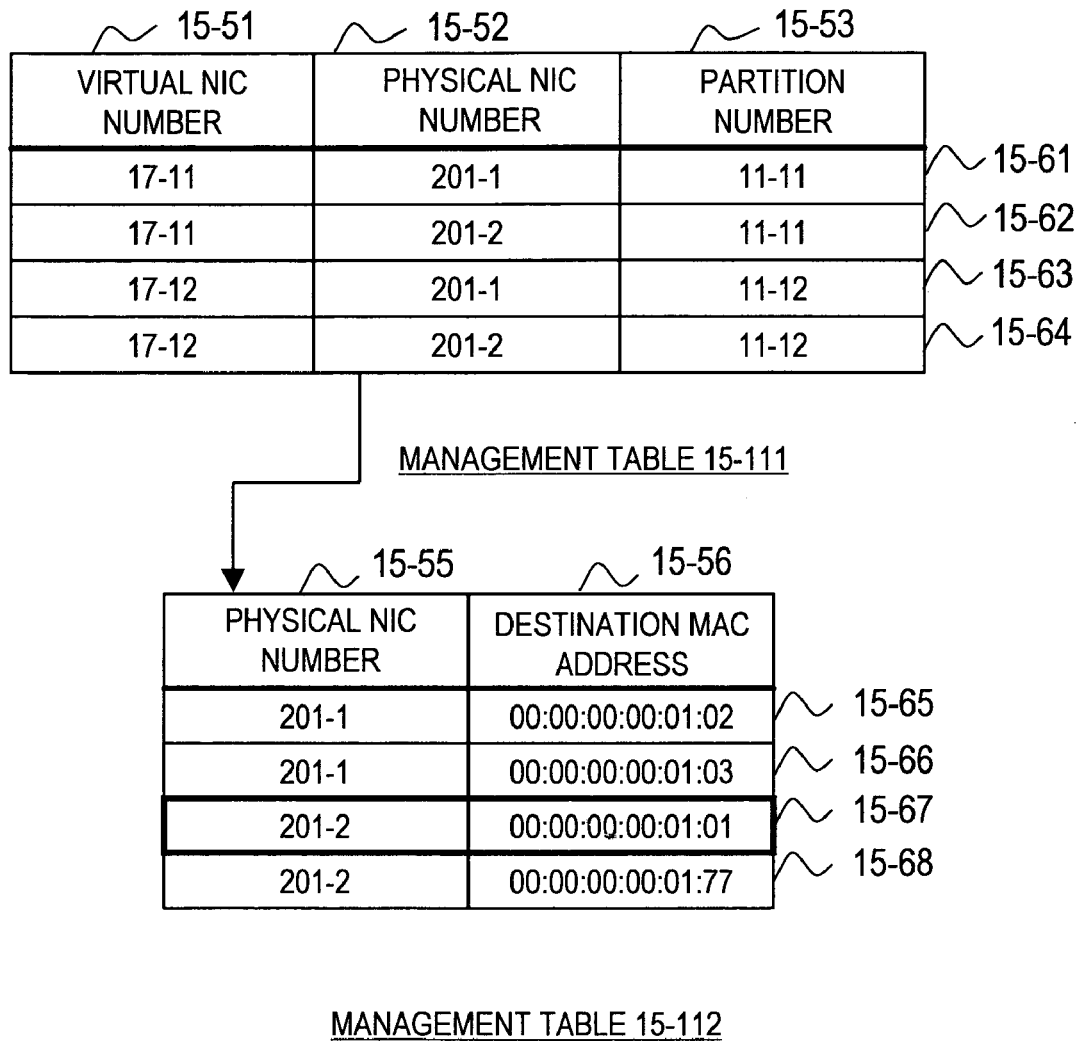
FIG. 18 is an explanatory view of the management table after an update according to the second embodiment of this invention.

As a result of this update, the management table 15 is updated to a state shown in FIG. 18.

Then, the user application program 110-1 uses the updated management table 15 to resume the communication with the client 302-1.

When one virtual NIC 17 is allocated to multiple physical NICs 201 in this way, communication can be carried out by automatically selecting a physical NIC 201 for the virtual NIC 17.

A description will now be given of the Fail Over between partitions.

Figure 19:
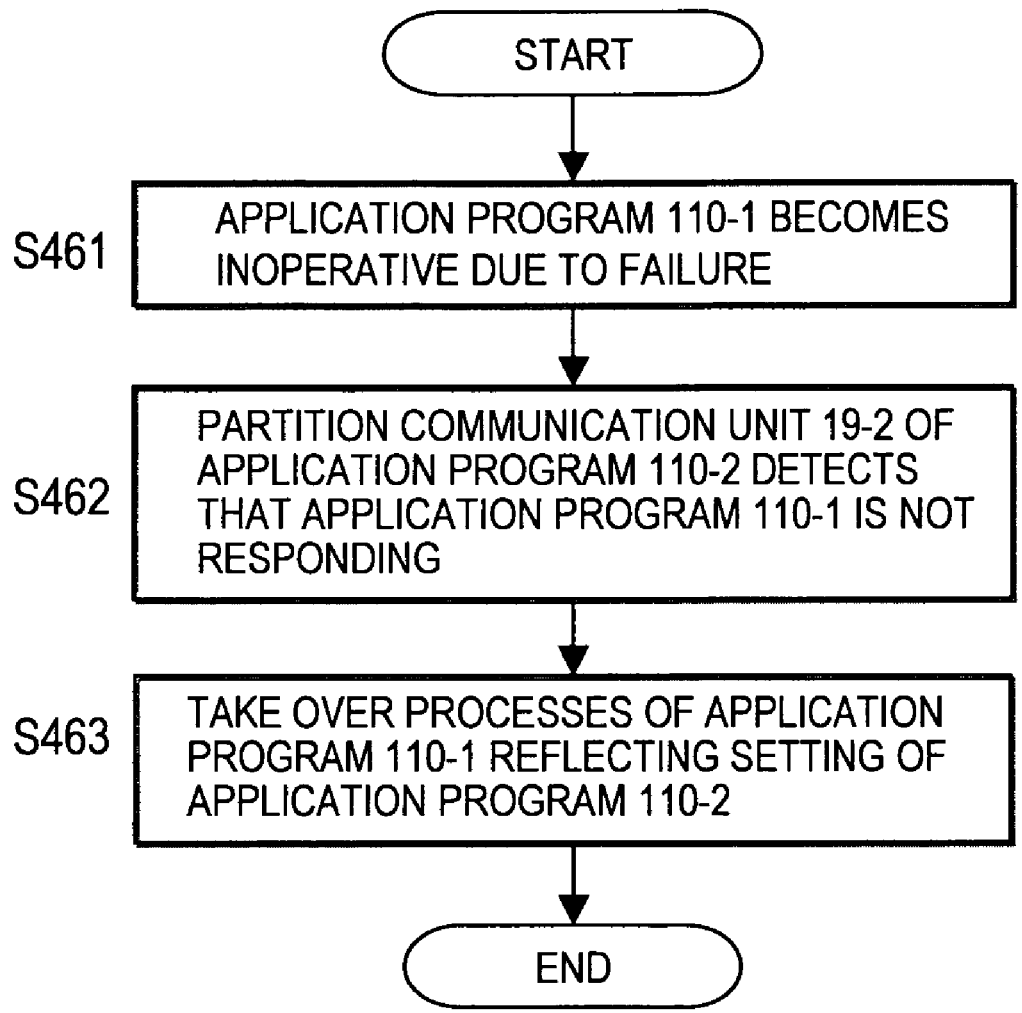
FIG. 19 is a flowchart of a process for a Fail Over according to the second embodiment of this invention.

FIG. 19 is a flowchart of a process of the Fail Over.

FIG. 19 shows a process, upon a failure occurring to the partition 11-11, to cause a process of the user application program 110-1 running in the partition 11-11 to be taken over by the user application program 110-2 in the spare partition 11-12.

First, a failure occurs to the user application program 110-1 operating in the partition 11-11, and the user application program 110-1 becomes inoperative (S461).

On this occasion, the user application program 110-2 in the spare partition 11-12 detects the failure of the user application program 110-1 by means of the partition communication unit 19-2 (S462).

To be specific, the partition communication units 19-1 and 19-2 always transmit/receive heartbeat communication between the user application program 110-1 and the user application program 110-2. The user application program 110-2 detects a failure of the user application program 110-1 based on an interruption of the heartbeat communication from the user application program 110-1. It should be noted that the user application program 110-1 itself may detect a failure, and if the user application program 110-1 determines that the operation is no longer possible, the user application program 110-1 may notify the user application program 110-2 in the spare partition 11-12 of an alert thereby enabling detection of the failure.

Then, the user application program 110-2 takes over processes of the user application program 110-1 reflecting setting application program 110-2 (S463).

To be specific, when the user application program 110-1 itself, the administrator 304, or the like changes the setting of the user application program 110-1, the user application program 110-1 notifies the user application program 110-2 of contents of the change to always maintain the settings of the user application program 110-1 and the user application program 110-2 identical. Then, application program 110-2 takes over the notified and set of user application 110-1.

It should be noted that the user application program 110-2 may retain information set by the administrator 304 and the like before the user application program 110-1 starts the operation, and this information may be used for the takeover.

After taking over the setting, the user application program 110-2 uses the virtual NIC 17-12 to start the communication with the client 302.

As described above, it is possible to increase the reliability by, on a failure to a user application program 110 in a partition 11, causing a user application program 110 in a partition 11 designated as a spare partition to take over a process.

In this way, according to the second embodiment of this invention, by assigning multiple physical NICs 201 to one virtual NIC 17, a physical NIC 201 can be automatically selected for communication on starting the communication by means of the virtual NIC 17. In this case, specifically, since the correspondences between the virtual NIC 17 and the physical NICs 201 is set by means of an ARP table, the setting on a failure can be automated without setting by the administrator 304.

It should be noted that the first embodiment and the second embodiment may be combined as an embodiment.

Third Embodiment

A description will now be given of a third embodiment.

A virtual computer system according to the third embodiment includes the service partition 12, and the service partition 12 manages the management table. Moreover, as in the second embodiment, multiple physical NICs 201 are allocated to one virtual NIC 17. According to this configuration, a Fail Over can be realized among the partitions 11. It should be noted that like components are denoted by like numerals as of the first and second embodiments, and descriptions thereof will be omitted.

Figure 20:
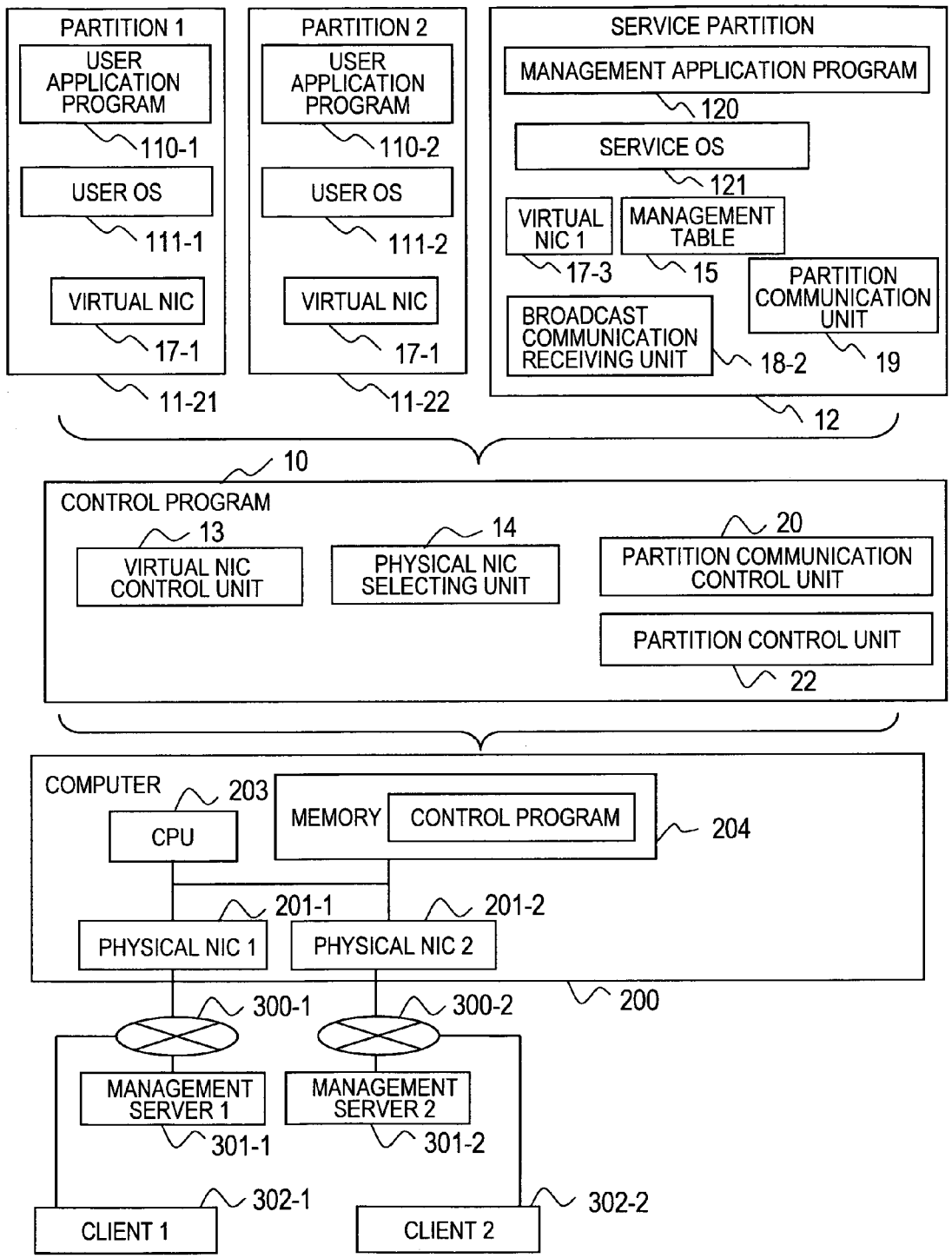
FIG. 20 is an explanatory view of an example of a management table according to a third embodiment of this invention.

FIG. 20 is a block diagram of the computer 200 and a virtual computer system according to the third embodiment of this invention.

According to the third embodiment, the service partition 12 includes the broad cast communication receiving unit 21, the management table 15, and the management table setting unit 16. In other words, the service partition 12 manages the management table 15.

Moreover, as in the second embodiment, multiple physical NICs 201 are allocated to one virtual NIC 17.

Contents of this management table 15 are the same as those of the second embodiment. In other words, the correspondences between the physical NIC 201 and the destination MAC address are determined in advance. If there occurs communication with a virtual NIC 17 in the control program 10, physical NICs 201 are selected according to the destination MAC address contained in the communication, and one of the physical NICs 201 corresponding to a virtual NIC 17 and a partition 11 is selected. Then, communication information is transmitted to the selected physical NIC 201.

Figure 21:
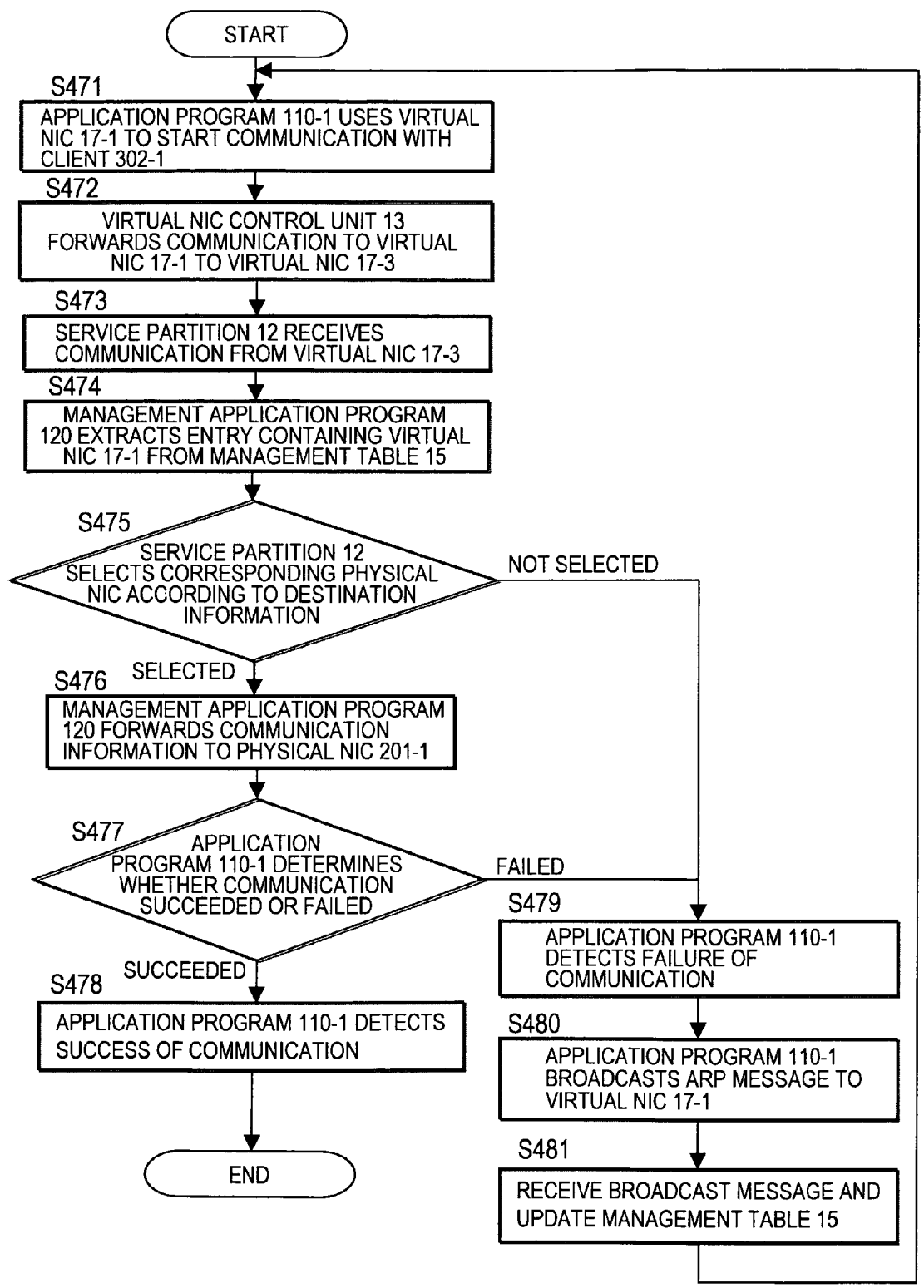
FIG. 21 is a flowchart of a process when a user application program communicates with a client according to the third embodiment of this invention.

FIG. 21 is a flowchart of a process of the user application program 110-1 and the control program 10 when the user application program 110-1 communicates with the client 302 outside the computer 200.

In the partition 11-11, the user application program 110-1 uses the virtual NIC 17-1 to start communication with the client 302-1 outside the computer 200. On this occasion, the user application program 110-1 transmits communication information, which is to be transmitted to the client 302-1, to the virtual NIC 17-11 (S471).

In the control program 10, if the virtual NIC control unit 13 detects that the virtual NIC 17-1 has received the communication information, the virtual NIC control unit 13 forwards the communication information to the virtual NIC 17-3 of the service partition 12 (S472).

In the service partition 12, the management application program 120 detects that the virtual NIC 17-3 has received the communication information (S473).

If the virtual NIC control unit 120 detects that the virtual NIC 17-3 has received the communication information, the management application program 120 obtains a destination MAC address contained in the communication information. Then, the management application program 120 refers to the management table 15 to select entries containing the obtained MAC address (S474).

Then, the management application program 120 determines whether a physical NIC 201 is selected or not based on the obtained information (S475). If the selection of the physical NIC 201 is successful, the process proceeds to a step S476. On the other hand, if the selection of a physical NIC 201 is failed due to the destination MAC address being not registered to the management table 15 or the like, the process proceeds to a step S479.

In the step S476, the management application program 120 forwards the communication information received from the virtual NIC 17-1 to the selected physical NIC 201. As a result, the communication information transmitted from the user application program 110-1 is transmitted to the client 302-1.

Then, the user application program 110-1 determines whether the communication succeeded or failed according to whether a response to the communication in the step S476 has been received or not (S477).

If the response from the client 302-1 is an expected result, the user application program 110-1 determines that the communication had been successful, and proceeds to a step S478. In the step S478, since the user application program 110-1 has received the expected response from the client 302-1, the user application program 110-1 determines that the communication was successful, and thus finishes the process in FIG. 21.

On the other hand, if the user application program 110-1 has not received the expected response from the client 302-1 due to a timeout or the like, the user application program 110-1 proceeds to the step S479.

In the step S479, the management application program 120 detects that the communication had failed due to a reason that, for example, the expected response was not received from the client 302, or the MAC address of the communication destination is not registered. Then, the user application program 110-1 executes a subsequent communication recovery process.

If the communication had failed, the user application program 110-1 transmits an ARP message to the virtual NIC 17-1 by means of the broadcast communication to update an ARP table (S480). This broadcast communication is forwarded to the virtual NIC 17-3.

In the service partition 12, the broadcast communication receiving unit 21 receives the broadcast communication transmitted from the virtual NIC 17-1 to the virtual NIC 17-3. Then, the control program 10 transmits this broadcast communication to the networks 300 via all the physical NICs 201. Then, if the broadcast communication receiving unit 21 receives a response to the broadcasted ARP message, the broadcast communication receiving unit 21 updates the ARP table based on a received content, and updates the management table 15.

As described above, the user application program 110-1 detects a failure in the communication path in communication via the virtual NIC 17, updates the ARP table if a failure is present, and deletes the physical NICs 201 relating to a path which cannot be reached from the management table 15.

In this way, according to the third embodiment of this invention, as the second embodiment, by assigning multiple physical NICs 201 to one virtual NIC 17, a physical NIC 201 can be automatically selected for communication at the start of the communication by means of the virtual NIC 17. In particular, since, without adding a physical configuration, the correspondences are set by the processing of the service partition 12, the cost can be maintained to low.

It should be noted that the first embodiment and the third embodiment may be combined as an embodiment.

As described above, according to the embodiments of this invention, the physical NICs are shared by multiple partitions, and even if the management application program in the service partition carries out a Fail Over, the Fail Over does not influence the communication to partitions other than the service partition, thereby making it possible to increase the reliability of the virtual computer system without adversely affecting the server consolidation.

While the present invention has been described in detail and pictorially in the accompanying drawings, the present invention is not limited to such detail but covers various obvious modifications and equivalent arrangements, which fall within the purview of the appended claims.

What is claimed is:

1. A control method carried out on a computer,
   the computer comprising a control module, a memory module for storing a control program executed by the control module, and physical interfaces composing a communication path to an external device,
   the computer being coupled to the external device via the physical interfaces,
   the computer having multiple logical partitions constructed therein by the control program,
   the physical interfaces being shared by virtual interfaces set for each of the multiple logical partitions,
   the memory module storing management information indicating correspondences between the physical interface and the virtual interface,
   the control method comprising the steps of:
   obtaining, by the control module, communication data transferred to the external device and received by the virtual interface;
   obtaining, by the control module, correspondences between the physical interface and the virtual interface,
   selecting, by the control module, the physical interface used for the communication with the external device based on the correspondences between the physical interface and the virtual interface; and changing, by the control module, the correspondence between the physical interface and the virtual interface if a failure occurs in the communication path.

2. The control method for the computer according to claim 1, wherein:
the logical partition includes a first logical partition and a second logical partition;
the first logical partition and the second logical partition respectively include a first virtual control module and a second virtual control module that are set up separately by the control program;
the control method further comprises the steps of:
allocating, by the control module, at least one of the physical interfaces to the second logical partition; and
transmitting, by the control module, the obtained communication data and the obtained correspondences to the second logical partition; and
forwarding, by the second logical partition, the received communication data to a physical interface corresponding to the obtained correspondences.

3. The control method for the computer according to claim 2, wherein:
the second logical partition includes a bridge module transferring data between the virtual interface and the physical interface; and
the control method further comprises the step of, forwarding, by the second logical partition, the received communication data to the physical interface via the bridge module corresponding to the selected physical interface.

4. The control method for the computer according to claim 3, wherein the management information includes a correspondence between one physical interface and at least one virtual interface.

5. The control method for the computer according to claim 4, wherein the management information includes a correspondence between one physical interface and one virtual interface.

6. The control method for the computer according to claim 1, wherein the management information includes a correspondence between one virtual interface and at least one physical interface.

7. The control method for the computer according to claim 2, wherein:
the second virtual control module executes a management program for managing the communication path; and
the control method further comprises the step of detecting, by the second virtual control module executing the management program, a failure in the communication path to the external device, through communication with the external device.

8. The control method for the computer according to claim 1, wherein:
the external device executes an external program; and
the control method further comprises the steps of:
communicating, by the external device, with the first logical partition or the second logical partition; and
detecting, by the external device, a presence of a failure of a component included in the computer as a result of the communication.

9. The control method for the computer according to claim 1, wherein:
the first logical partition executes a user program; and
the control method further comprises the steps of:
referring, by the first logical partition, to the management information; and selecting, by the first logical partition, the virtual interface used to communicate with the external device as a result of the reference.

10. The control method for the computer according to claim 9, further comprising the step of detecting by the first virtual control module, of a failure of the physical interface corresponding to the virtual interface, as a result of communication with the external device by execution of the user program.

11. The control method for the computer according to claim 1, further comprising the steps of:
receiving, by the control module, a change request for setting of the management information; and
updating, by the control module, the management information according to the change request.

12. The control method for the computer according to claim 11, wherein:
the change request includes a priority of a virtual interface which shares a physical interface; and
the control method further comprises the step of updating, by the control module, the priority in the management information according to the change request.

13. The control method for the computer according to claim 1, further comprising the steps of:
extracting, by the control module, destination information of the communication data transferred to the external device and received by the virtual interface;
acquiring, by the control module, a correspondence from the obtained correspondence between the virtual interface and the physical interface relating to the destination information with reference to a correspondences between the physical interface and the destination information; and
selecting, by the control module, the physical interface used for the communication with the external device according to the acquired correspondence.

14. The control method for the computer according to claim 2, wherein:
the second virtual control module execute a management program for managing the communication path; and
the method further comprises the steps of:
extracting, by the second virtual control module, destination information of the communication data transferred to the external device and received by the virtual interface;
acquiring, by the second virtual control module, a correspondence from the obtained correspondence between the virtual interface and the physical interface relating to the destination information with reference to a correspondences between the physical interface and the destination information; and
selecting, by the second virtual control module, the physical interface used for the communication with the external device according to the acquired correspondence.

15. The control method for the computer according to claim 1, wherein:
the logical partition includes a first logical partition, and a third logical partition set as a spare of the first logical partition;
the first logical partition and the third logical partition respectively include a first virtual control module and a third virtual control module partitioned by the control program;
the first logical partition and the third logical partition respectively execute a first user program and a second user program; and
the method further comprises the steps of:

detecting, by a first virtual control module, a failure of the physical interface corresponding to the virtual interface through communication with the external device;

notifying, by a first virtual control module, the third logical partition of a failure of the physical interface;

selecting, by the third virtual control module, a virtual interface corresponding to a physical interface different from the physical interface relating to the failure when receiving a notice of a failure; and resuming, by the third virtual control module, the communication of the first logical partition with the external device.

16. A machine-readable medium, containing at least one sequence of instruction for controlling a computer, the computer comprising a control module, a memory module for storing a control program executed by the control module, and physical interfaces including a communication path to an external device, and being coupled to the external device via the physical interfaces, the instruction that, when executed causes the computer to:

divide the computer into multiple logical partitions;

set virtual interfaces sharing the physical interfaces for each of the multiple logical partition;

store management information indicating correspondences between the physical interface and the virtual interface into the memory module;

acquire communication data transferred to the external device and received by the virtual interface;

select the physical interface used for the communication with the external device with reference to the management information; and change the correspondence between the physical interface and the virtual interface upon a failure to the communication path, wherein the computer further comprises a processor that executes the instruction.

17. A virtual computer system, comprising:

a computer comprising: a processor; a control module; a memory module for storing a control program controlled by the control module; and physical interfaces including a communication path to an external device, wherein the computer is coupled to the external device via the physical interface, wherein the computer has multiple logical partitions constructed therein by the control program, and wherein the physical interfaces are shared by virtual interfaces set for each of the multiple logical partitions;

a management information control module for storing management information indicating correspondences between the physical interface and the virtual interface in the memory module;

a virtual interface control module for obtaining communication data transferred to the external device and received by the virtual interface;

a physical interface selecting module for referring to the management information to select the physical interface used for the communication with the external device; and a control module for changing the correspondence between the physical interface and the virtual interface if a failure occurs in the communication path.

* * * * *